United States Patent [19]
Takahara

[11] 3,917,805
[45] Nov. 4, 1975

[54] PRODUCTION OF PHOSPHORIC ACID OF HIGH PURITY

[76] Inventor: Masaki Takahara, No. 2-34, Fukaya-cho, Nishinomiya, Hyogo, Japan

[22] Filed: Apr. 5, 1974

[21] Appl. No.: 458,369

[30] Foreign Application Priority Data
Oct. 12, 1973  Japan.............................. 48-115084

[52] U.S. Cl................................. 423/321; 423/320
[51] Int. Cl.² ........................................ C01B 25/16
[58] Field of Search ................. 423/320, 321, 321 S

[56] References Cited
UNITED STATES PATENTS
3,410,656  11/1968  Bunin et al. ..................... 423/321 S FOREIGN PATENTS OR APPLICATIONS
180,569  11/1966  U.S.S.R............................. 423/321
1,209,272  10/1970  United Kingdom ............ 423/321 S Primary Examiner—Oscar R. Vertiz
Assistant Examiner—Eugene T. Wheelock

[57] ABSTRACT

A process for production of phosphoric acid of high purity from crude phosphoric acid obtained by decomposition of an ore of phosphorus with sulfuric acid which comprises extracting the crude phosphoric acid with a water-immiscible organic solvent selected from the group consisting of alkanols having 6 to 8 carbon atoms and ethers of polyvalent alcohols with alkanols having 3 to 8 carbon atoms, washing the resulting extract at least 4 times with water, optionally containing phosphoric acid, the total amount of the water for washing being 25 to 50 parts by weight to 100 parts by weight of the phosphoric acid contained in the extract, and back extracting the washed extract with water, optionally followed by concentration of the resultant water extract.

5 Claims, No Drawings

PRODUCTION OF PHOSPHORIC ACID OF HIGH PURITY

The present invention relates to a process for production of phosphoric acid. More particularly, it relates a process for production of phosphoric acid of high purity, i.e. markedly reduced in its content of inorganic impurities.

Crude phosphoric acid obtained by decomposition of an ore of phosphorus with mineral acids such as hydrochloric acid and sulfuric acid usually includes considerable amounts of inorganic impurities such as iron, arsenic, aluminum, lead, vanadium, titanium, silica, sulfate and chloride. For removal of the inorganic impurities from the crude phosphoric acid to obtain a high purity of phosphoric acid, there has been proposed the so-called "solvent extraction process" wherein various water-immiscible organic solvents are used for extraction of phosphoric acid. There have also been proposed many processes which can eliminate some drawbacks found in the solvent extraction process.

The solvent extraction process generally comprises the treatment of crude phosphoric acid obtained by decomposition of an ore of phosphorus with a water-immiscible organic solvent to extract the phosphoric acid and the subsequent treatment of the extract with water to back extract the phosphoric acid. In the treatment with the water-immiscible organic solvent in the first step, the inorganic impurities present in the crude phosphoric acid are more or less extracted into the organic solvent. Therefore, the subsequent treatment of the resulting organic extract with water can not prevent the movement of the inorganic impurities into the water and the resultant phosphoric acid solution is somewhat contaminated with the inorganic impurities.

In order to overcome such a drawback, there have been proposed various processes for removal of the contaminating inorganic impurities from the phosphoric acid solution, some examples of which are as follows:

1. Removal of silica: Japanese Patent Publications Nos. 15893/1968 and 30174/1968;
2. Removal of calcium: Japanese Patent Publication No. 17284/1968;
3. Removal of arsenic and iron: Japanese Patent Publications Nos. 8252/1962 and 11/1963;
4. Removal of sulfate: Japanese Patent Publication No. 7753/1964;
5. Removal of chloride: Japanese Patent Publications Nos. 10016/1960, 8252/1962, 11/1963, 13603/1963 and 7753/1964.

However, all these conventional processes are not industrially satisfactory, for instance, since they require troublesome operations, need expensive or large apparatus, or produces phosphoric acid with insufficiently high purity and the like. Among the above, the processes using ion exchange resins for removal of the inorganic impurities (cf. Japanese Patent Publications Nos. 8252/1962, 11/1963, 17284/1968, etc.) are relatively favorable in the satisfactory purity of the resulting phosphoric acid but still have a certain disadvantage, for instance, in the high production cost of phosphoric acid due to the use of comparatively expensive ion exchange resins.

As the result of an extensive study, it has now been found that the inorganic impurities unavoidably contaminating the phosphoric acid extract obtained by extraction of crude phosphoric acid with a water-immiscible organic solvent, can be efficiently eliminated by washing such an organic extract with water under a certain conditions and the back extraction of the washed organic extract with water can produce a solution of phosphoric acid of satisfactorily high purity. That is, the adoption of a simple operation such as multiple water washings between the extraction with a water-immiscible organic solvent and the back extraction with water makes it possible to obtain a high purity of phosphoric acid without using such an expensive material as an ion exchange resin. The present invention is based on the above finding.

The process of this invention comprises extracting crude phosphoric acid, which is obtained by decomposition of an ore of phosphorus with sulfuric acid, with a water-immiscible organic solvent selected from the group consisting of alkanols having 6 to 8 carbon atoms and ethers of polyvalent alcohols with alkanols having 3 to 8 carbon atoms, washing the resulting extract at least 4 times with water, optionally containing phosphoric acid, the total amount of the water for these washings being 25 to 50 parts by weight to 100 parts by weight of the phosphoric acid contained in the extract, and back extracting the washed organic extract with water, optionally followed by concentration of the resultant water extract to give phosphoric acid of high purity.

Examples of the alkanols having 6 to 8 carbon atoms are 2-octanol, 2-ethylhexanol, 3-methylhexanol, 5-methylhexanol, etc. Examples of the ethers of polyvalent alcohols with alkanols having 3 to 8 carbon atoms are diethyleneglycol di-n-butyl ether, glycol di-n-butyl ether, etc. These organic solvents will be hereinafter referred to as "water-immiscible organic solvent".

The extraction of the crude phosphoric acid with the water-immiscible organic solvent may be carried out batchwise or continuously at a temperature from room temperature to about 100°C.

When sulfuric acid is used in excess for completion of the decomposition of an ore of phosphorus, a considerable amount of sulfuric acid may be present in the resulting crude phosphoric acid. In such case, calcium hydroxide or barium hydroxide may be added thereto so, that the sulfuric acid is precipitated in the form of calcium sulfate or barium sulfate. The resultant slurry is subjected to extraction with the water-immiscible organic solvent and then the resulting organic extract is subjected to the treatment for purification as hereinafter described.

The the water-immiscible organic solvent extract is then repeatedly washed with water, optionally containing phosphoric acid. The washing should be repeated at least 4 times, preferably at least 6 times, the total amount of water used being 20 to 50 parts by weight to 100 parts by weight of the phosphoric acid contained in the organic extract. When the content of each inorganic impurity in the washing water is less than 1 ppm, the washing operation is terminated. The washing is usually effected at room temperature.

Then, the washed organic extract is back extracted with water optionally containing phosphoric acid, usually at a temperature from room temperature to about 100°C (preferably from about 60° to 100°C). No limitation is present on the proportion of the extract and the water, but the amount of the water should be as little as possible.

The resultant water extract, i.e. aqueous solution of phosphoric acid, is usually concentrated. However, this concentration operation is optional.

The water-immiscible organic solvent after the back extraction may be again used for extraction of the crude phosphoric acid. When contaminated to a considerable extent, it may be purified, for instance, by washing with an alkali carbonate solution or treating with activated carbon.

Further, the aqueous phase after the extraction of the crude phosphoric acid with the water-immiscible organic solvent, as well as the water washings produced in the washing of the water-immiscible organic solvent extract of phosphoric acid may be combined into the crude phosphoric acid, and then the resulting mixture may be subjected to extraction with the water-immiscible organic solvent as above. Thus, the phosphoric acid in the system is not materially lost.

Practical and presently preferred embodiments of the invention are illustratively shown in the following Examples.

EXAMPLE 1

37.5 % Crude phosphoric acid solution obtained by decomposition of an ore of phosphorus with sulfuric acid is concentrated, and excess of sulfuric acid therein is neutralized with calcium hydroxide. After filtration of the precipitated calcium sulfate, the resultant 75 % crude phosphoric acid solution (200 g) is admixed with 2-octanol (500 g), and vigorous stirred at room temperature (about 10 to 20°C). The aqueous phase is separated from the organic phase. The organic phase, which contains phosphoric acid, is washed five times with water (20 g, 20 g, 10 g, 10 g, 3 g) at room temperature. The contents of the inorganic impurities in the washings are checked each time. When the content of each inorganic impurity is less than 1 ppm, the washing operation is stopped. The organic layer after the washing is back extracted with water (100 g) at room temperature. In the resulting aqueous extract, i.e. aqueous solution of phosphoric acid, the presence of 75 g of phosphoric acid is confirmed. The content of each inorganic impurity as examined is trace, and the quality of the phosphoric acid solution meets the requirements in JIS (Japanese Industrial Standard) K1449–1957.

The aqueous phase separated in the extraction with 2-octanol and the washings obtained in the washing treatment are combined into the starting crude phosphoric acid and again subjected to extraction with 2-octanol. Therefore, phosphoric acid can be recovered without any material loss. The organic layer after the back extraction is used again for the extraction of crude phosphoric acid.

The amount of phosphoric acid and the contents of the inorganic impurities at various stages in the process of this Example are analyzed and shown in Table 1.

Table 1

|  |  | Phosphoric acid | | $Fe_2O_3$ (%) | | AS (%) | | $Al_2O_3$ (%) | |
|---|---|---|---|---|---|---|---|---|---|
|  |  | Aqueous phase | Solvent phase | Aqueous phase | Solvent phase | Aqueous phase | Solvent phase | Aqueous phase | Solvent phase |
| Crude phosphoric acid |  | (150 g) |  | 0.89 |  | 0.3 |  | 0.17 |  |
| Extraction with solvent |  | (60 g) | (90 g) | 0.63 | 0.23 | 0.21 | 0.09 | 0.12 | 0.05 |
| Washing with water (Amount of water used) | 1st (20 g) | (4.5 g) | (85.5 g) | 0.14 | 0.09 | 0.07 | 0.02 | 0.042 | 0.008 |
|  | 2nd (20 g) | (4.6 g) | (80.9 g) | 0.07 | 0.02 | 0.018 | 0.002 | 0.007 | 0.001 |
|  | 3rd (10 g) | (2.5 g) | (78.4 g) | 0.013 | 0.007 | 0.0018 | 0.0002 | 0.0008 | 0.0002 |
|  | 4th (10 g) | (2.7 g) | (75.7 g) | 0.006 | 0.001 | 0.0001 | 0.0001 | 0.0001 | 0.0001 |
|  | 5th (3 g) | (0.5 g) | (75.2 g) | 0.0009 | 0.0001 | Trace | Trace | Trace | Trace |
| Back extraction with water (100 g) |  | (75 g) | (0.2 g) | Trace | Trace |  |  |  |  |

|  |  | Pb (%) | | $SiO_2$ (%) | | CaO (%) | | $SO_4$ (%) | | Cl (%) | |
|---|---|---|---|---|---|---|---|---|---|---|---|
|  |  | Aqueous phase | Solvent phase | Aqueous phase | Solvent phase | Aqueous phase | Solvent phase | Aqueous phase | Solvent phase | Aqueous phase | Solvent phase |
| Crude phosphoric acid |  | 0.04 |  | 1.65 |  | 1.32 |  | 0.08 |  | 0.001 |  |
| Extraction with Solvent |  | 0.026 | 0.004 | 1.48 | 0.17 | 1.16 | 0.16 | 0.04 | 0.04 | 0.008 | 0.002 |
| Washing with water (Amount of water used) | 1st (20 g) | 0.0037 | 0.0003 | 0.16 | 0.01 | 0.15 | 0.01 | 0.02 | 0.02 | 0.0017 | 0.0003 |
|  | 2nd (20 g) | 0.0002 | 0.0001 | 0.007 | 0.0003 | 0.007 | 0.003 | 0.012 | 0.008 | 0.0002 | 0.0001 |
|  | 3rd (10 g) | Trace | Trace | 0.0002 | 0.0001 | 0.0023 | 0.0002 | 0.006 | 0.002 | Trace | Trace |
|  | 4th (10 g) |  |  | Trace | Trace | 0.0001 | 0.001 | 0.001 | 0.001 |  |  |
|  | 5th (3 g) |  |  |  |  | Trace | Trace | 0.0009 | 0.0001 |  |  |
| Back extraction with water (100 g) |  |  |  |  |  |  |  | Trace | Trace |  |  |

EXAMPLE 2

As in Example 1, 75 % crude phosphoric acid solution (200 g) is extracted with 2-ethylhexanol (500 g). The organic phase, which contains phosphoric acid, is washed five times with water (20 g, 20 g, 10 g, 10 g, 2 g) at room temperature. The contents of the inorganic impurities in the washings are checked each time. When the content of each inorganic impurity is less than 1 ppm, the washing operation is stopped. The organic layer after the washing is back extracted with water (100 g) at room temperature. In the resulting aqueous extract, i.e. aqueous solution of phosphoric acid, the presence of 75 g of phosphoric acid is confirmed. The content of each inorganic impurity as examined is trace, and the quality of the phosphoric acid solution meets the requirements in JIS K1449–1957.

The amount of phosphoric acid and the contents of the inorganic impurities at various stages in the process of this Example are analyzed and shown in Table 2.

tents of the inorganic impurities in the washings are checked each time. When the content of each inorganic impurity is less than 1 ppm, the washing operation is stopped. The organic layer after the washing is back extracted with water (100 g) at room temperature. In the resulting aqueous extract, i.e. aqueous solution of phosphoric acid, the presence of 75 g of phosphoric acid is confirmed. The content of each inorganic Table 2

|  |  | Phosphoric acid | | $Fe_2O_3$ (%) | | As (%) | | $Al_2O_3$ (%) | |
|---|---|---|---|---|---|---|---|---|---|
|  |  | Aqueous phase | Solvent phase | Aqueous phase | Solvent phase | Aqueous phase | Solvent phase | Aqueous phase | Solvent phase |
| Crude phosphoric acid |  | (150 g) |  | 0.89 |  | 0.3 |  | 0.17 |  |
| Extraction with solvent |  | (53 g) | (97 g) | 0.69 | 0.20 | 0.25 | 0.07 | 0.12 | 0.05 |
| Washing with water (Amount of water used) | 1st (20 g) | 4.5 g) | (92.5 g) | 0.125 | 0.075 | 0.046 | 0.024 | 0.046 | 0.004 |
|  | 2nd (20 g) | (4.5 g) | (87.5 g) | 0.065 | 0.018 | 0.018 | 0.006 | 0.0025 | 0.0015 |
|  | 3rd (10 g) | (2.6 g) | (84.9 g) | 0.012 | 0.004 | 0.0055 | 0.0005 | 0.0012 | 0.0003 |
|  | 4th (10 g) | (2.5 g) | (82.4 g) | 0.0038 | 0.0002 | 0.0004 | 0.0001 | 0.0002 | 0.0001 |
|  | 5th (2 g) | (0.4 g) | (82 g) | 0.0001 | 0.0001 | 0.0001 | 0.0001 | Trace | Trace |
| Back extraction with water (100 g) |  | (81.5 g) | (0.5 g) |  |  |  |  |  |  |

|  |  | Pb (%) | | $SiO_2$ (%) | | CaO (%) | | $SO_4$ (%) | | Cl (%) | |
|---|---|---|---|---|---|---|---|---|---|---|---|
|  |  | Aqueous phase | Solvent phase | Aqueous phase | Solvent phase | Aqueous phase | Solvent phase | Aqueous phase | Solvent phase | Aqueous phase | Solvent phase |
| Crude phosphoric acid |  | 0.04 |  | 1.65 |  | 1.32 |  | 0.08 |  | 0.001 |  |
| Extraction with solvent |  | 0.039 | 0.001 | 1.51 | 0.14 | 1.22 | 0.10 | 0.05 | 0.03 | 0.0007 | 0.00003 |
| Washing with water (Amount of water used) | 1st (20 g) | 0.0007 | 0.0003 | 0.13 | 0.01 | 0.08 | 0.02 | 0.023 | 0.007 | Trace | Trace |
|  | 2nd (20 g) | 0.00027 | 0.00003 | 0.008 | 0.002 | 0.016 | 0.004 | 0.006 | 0.001 |  |  |
|  | 3rd (10 g) | Trace | Trace | 0.0019 | 0.00001 | 0.0038 | 0.0002 | 0.0008 | 0.0002 |  |  |
|  | 4th (10 g) |  |  | Trace | Trace | 0.0001 | 0.0001 | 0.0001 | 0.0001 |  |  |
|  | 5th (2 g) |  |  |  |  |  |  | Trace | Trace |  |  |
| Back extraction with water (100 g) |  |  |  |  |  |  |  |  |  |  |  |

EXAMPLE 3

As in Example 1, 75 % crude phosphoric acid solution (200 g) is extracted with heptanol (3- or 5-methylhexanol) (500 g). The organic phase, which contains phosphoric acid, is washed five times with water (20 g, 20 g, 10 g, 10 g, 2 g) at room temperature. The conimpurity as examined is trace, and the quality of the phosphoric acid solution meets the requirements in JIS K1449–1957.

The amount of phosphoric acid and the contents of the inorganic impurities at various stages in the process of this Example are analyzed and shown in Table 2.

Table 3

|  |  | Phosphoric acid | | $Fe_2O_3$ (%) | | As (%) | | $Al_2O_3$ (%) | |
|---|---|---|---|---|---|---|---|---|---|
|  |  | Aqueous phase | Solvent phase | Aqueous phase | Solvent phase | Aqueous phase | Solvent phase | Aqueous phase | Solvent phase |
| Crude phosphoric acid |  | (150 g) |  | 0.89 |  | 0.3 |  | 0.17 |  |
| Extraction with solvent |  | (45 g) | (105 g) | 0.76 | 0.13 | 0.23 | 0.02 | 0.14 | 0.03 |
| Washing with water (Amount of water used) | 1st (20 g) | (4.5 g) | (100.5 g) | 0.11 | 0.02 | 0.017 | 0.003 | 0.024 | 0.006 |
|  | 2nd (20 g) | (4.5 g) | (96 g) | 0.01 | 0.008 | 0.002 | 0.001 | 0.0058 | 0.0002 |
|  | 3rd (10 g) | (2.5 g) | (93.5 g) | 0.007 | 0.001 | 0.0008 | 0.0002 | 0.0001 | 0.0001 |
|  | 4th (10 g) | (2.6 g) | (90.7) | 0.0008 | 0.0002 | 0.0001 | 0.0001 | Trace | Trace |
|  | 5th (2 g) | (0.4 g) | (90.3 g) | 0.0001 | 0.0001 |  |  |  |  |
| Back extraction with water (100 g) |  | (90 g) | (0.3 g) |  |  |  |  |  |  |
|  |  | Pb (%) | | $SiO_2$ (%) | | CaO (%) | | $SO_4$ (%) | | Cl (%) | |

Table 3-continued

|  | Phosphoric acid | | Fe$_2$O$_3$ (%) | | As (%) | | Al$_2$O$_3$ (%) | | | |
|---|---|---|---|---|---|---|---|---|---|---|
|  | Aqueous phase | Solvent phase | Aqueous phase | Solvent phase | Aqueous phase | Solvent phase | Aqueous phase | Solvent phase | | |
|  | Aqueous phase | Solvent phase | Aqueous phase | Solvent phase | Aqueous phase | Solvent phase | Aqueous phase | Solvent phase | Aqueous phase | Solvent phase |
| Crude phosphoric acid | 0.04 | | 1.65 | | 1.32 | | 0.08 | | 0.001 | |
| Extraction with solvent | 0.036 | 0.004 | 1.52 | 0.13 | 1.20 | 0.12 | 0.06 | 0.02 | 0.0008 | 0.0002 |
| Washing with water (Amount of water used) 1st (20 g) | 0.0037 | 0.0003 | 0.127 | 0.003 | 0.11 | 0.01 | 0.016 | 0.004 | 0.0001 | 0.0001 |
| 2nd (20 g) | 0.0002 | 0.0001 | 0.0023 | 0.0007 | 0.008 | 0.0002 | 0.0032 | 0.0003 | Trace | Trace |
| 3rd (10 g) | Trace | Trace | 0.00065 | 0.00035 | 0.0001 | 0.0001 | 0.0005 | 0.0003 | | |
| 4th (10 g) | Trace | Trace | Trace | Trace | Trace | Trace | 0.0002 | 0.0001 | | |
| 5th (2 g) | | | | | | | Trace | Trace | | |
| Back extraction with water (100 g) | | | | | | | | | | |

What is claimed is:

1. A process for production of phosphoric acid, with reduced inorganic impurities, from crude phosphoric acid obtained by decomposition of an ore of phosphorus with sulfuric acid, which comprises extracting the crude phosphoric acid with a water-immiscible organic solvent selected from the group consisting of alkanols having 6 to 8 carbon atoms, washing the resulting extract at least 4 times with water, or water containing phosphoric acid, the total amount of the water for washing being 25 to 50 parts by weight to 100 parts by weight of the phosphoric acid contained in the extract, and back extracting the washed extract with water, to obtain aqueous phosphoric acid with reduced inorganic impurities.

2. A process, as in claim 1, wherein the product aqueous phosphoric acid is subsequently concentrated.

3. The process according to claim 1, wherein the water-immiscible organic solvent is a member selected from the group consisting of 3-methylhexanol and 5-methylhexanol.

4. The process according to claim 1, wherein the washing with water is carried out at least 6 times.

5. The process according to claim 1, wherein the washing is carried out until the content of each inorganic impurity in the washing water is made to be less than 1 ppm.

* * * * *